(12) United States Patent
Ulrich

(10) Patent No.: US 7,104,397 B2
(45) Date of Patent: Sep. 12, 2006

(54) DISK CASE WITH SWING-OUT DISK-HOLDING INSERT WITH FRANGIBLE WEB

(75) Inventor: Peter Ulrich, Berlin (DE)

(73) Assignee: Gundlach Berlin Display + Verpackung GmbH, Berlin (DE)

( * ) Notice: Subject to any disclaimer, the term of this patent is extended or adjusted under 35 U.S.C. 154(b) by 150 days.

(21) Appl. No.: 10/852,729

(22) Filed: May 24, 2004

(65) Prior Publication Data

US 2005/0011784 A1 Jan. 20, 2005

(30) Foreign Application Priority Data

May 23, 2003 (EP) .................................. 03090156

(51) Int. Cl.
*B65D 85/57* (2006.01)
*A47B 81/06* (2006.01)

(52) U.S. Cl. .................. 206/308.1; 312/9.42; 312/9.58
(58) Field of Classification Search ............. 206/308.1, 206/309–313; 312/9.16, 9.42, 9.47, 9.58
See application file for complete search history.

(56) References Cited

U.S. PATENT DOCUMENTS

| 4,770,474 A | 9/1988 | Ackeret |
| 5,188,230 A | 2/1993 | O'Brien |
| 5,238,107 A * | 8/1993 | Kownacki ................ 206/308.1 |
| 5,244,084 A * | 9/1993 | Chan ........................ 206/308.1 |
| 5,385,231 A | 1/1995 | Nowotay |
| 5,425,451 A | 6/1995 | Blase |
| 5,692,607 A * | 12/1997 | Brosmith et al. ........ 206/308.1 |
| 5,946,290 A * | 8/1999 | Mizutani et al. ......... 206/308.1 |
| 6,079,557 A | 6/2000 | Lammerant |
| 6,318,550 B1 | 11/2001 | Giovinazzi |

FOREIGN PATENT DOCUMENTS

| DE | 38 20 239 | 12/1989 |
| DE | 298 00 899 | 4/1998 |
| EP | 1 045 395 | 10/2000 |
| GB | 2 276 609 | 3/1993 |
| WO | 98/044 78 | 2/1998 |

* cited by examiner

*Primary Examiner*—Bryon Gehman
(74) *Attorney, Agent, or Firm*—Andrew Wilford

(57) ABSTRACT

A media-disk case has an envelope having spaced front and back walls forming a cavity opening at an edge formed with a cutout, a plastic pin extending along an axis in the cavity and having ends fixed adhesively to the walls, and a plastic insert formed with a seat adapted to hold the disk, with a thickened edge region, and with a hole traversed by the pin. The insert is fittable in the cavity and pivotal about the pin between an open position largely outside the cavity and a closed position contained in the cavity and with the edge region fitting in the cutout. A plastic stop adhesively fixed to the walls in the cavity offset from the pin is closely juxtaposed with and bears on the insert in the closed position. A frangible plastic web is unitarily formed with the stop and with the insert. The insert can only be moved from the closed position to the open position on rupturing of the web.

20 Claims, 5 Drawing Sheets

DISK CASE WITH SWING-OUT DISK-HOLDING INSERT WITH FRANGIBLE WEB

FIELD OF THE INVENTION

The present invention relates to a disk case. More particularly this invention concerns a case with a swing-out insert that holds a media disk.

BACKGROUND OF THE INVENTION

A media disk, typically a DVD or CD although the case could be used with an optical disk or conceivably even with an LP vinyl record, is stored, transported, and sold in a case that on the one hand must protect the normally fragile disk, but that also must be openable so that a user has easy access to the disk. In addition it is often necessary that the case be secure so that the package is dramatically changed once the user has first opened it, to prevent the disks from being pilfered from the cases in the store.

There are basically three classes of such cases. In the oldest type the case is made like a book. It has a main part invariably made of injection-molded plastic that is formed with a seat having a hub to which the disk can be clipped by its center hole. One or more flaps of cardboard or plastic can close over this insert to protect the disk on the seat. In the traditional jewel box, there is a single flap held in place by extremely fragile ears that are typically broken off after moderate use, reducing the case to a two-part hard-to-handle assembly. Such cases must normally be enclosed in shrink wrap to provide some sort of tamper indication. Thus the cost of the packaging normally exceeds the cost to press and print the actual disk. See for example U.S. Pat. No. 5,188,230.

It is known to provide some form of tamper indication in a package where an integral web between parts is broken when the package is first opened. Such a system has the advantage that it is impossible to open the package and take out the disk without leaving evidence behind, but once again the cases are invariably of complex and expensive construction. See for example U.S. Pat. Nos. 5,385,231 and 6,079,557 as well as US 2002/0046959.

It is also known to mount the insert having the seat or seats that hold the disk or disks such that it can pivot between a closed position wholly contained in the case and an open position swung out so that the disk or disks can be picked off the insert. While such a case is preferred for an expensive DVD which is fairly delicate, it still is very expensive to manufacture, is often fairly fragile, and is rarely provided with any type of tamper proofing. See for example U.S. pat. Nos. 4,770,474, 5,525,451, 6,318,550, British 2,276,609, German 3,820,239 and 298 00 899, EP 1,045,395, and WO 98/04478.

All the known disk cases are of fairly complex construction. They are made up of several different parts, often of custom-made injection-molded construction, and their assembly is a multistep process involving the piecemeal assembly of the various parts.

OBJECTS OF THE INVENTION

It is therefore an object of the present invention to provide an improved media-disk case.

Another object is the provision of such an improved media-disk case which overcomes the above-given disadvantages, that is of simple yet durable construction, yet that has a foolproof tamper indication.

A further object is to provide a method of making such a disk case which reduces assembly steps so as to hold down manufacturing costs.

SUMMARY OF THE INVENTION

A media-disk case has according to the invention an envelope having spaced front and back walls forming a cavity opening at an edge formed with a cutout, a plastic pin extending along an axis in the cavity and having ends fixed adhesively to the walls, and a plastic insert formed with a seat adapted to hold the disk, with a thickened edge region, and with a hole traversed by the pin. The insert is fittable in the cavity and pivotal about the pin between an open position largely outside the cavity and a closed position contained in the cavity and with the edge region fitting in the cutout. A plastic stop adhesively fixed to the walls in the cavity offset from the pin is closely juxtaposed with and bears on the insert in the closed position. A frangible plastic web is unitarily formed with the stop and with the insert. The insert can only be moved from the closed position to the open position on rupturing of the web.

Thus with this system the package can be delivered to the vending location with the web intact, so that any opening of the package will be immediately detectable. In addition, forming the stop with the insert simplifies assembly of the case, since the insert and stop can be handled as a single piece.

The envelope in accordance with the invention is generally rectangular and has four corners. The pin is at one of the corners and the stop is at an adjacent one of the corners. The stop and insert bear on each other in the closed position along a line. Since to start with the insert and stop are fixed relative to each other by the frangible web, they will always be perfectly positioned relative to each other in the envelope. The line extends at about 45° to adjacent edges of the envelope.

In accordance with the invention the pin, the insert, and the stop are of the same plastic. In fact they are molded as a single piece. Since they do not need to form a flexible hinge, as in much of the prior art, a cheap or recycled plastic having little elasticity can be used.

The stop is generally right-triangular and both the stop and the pin have bumpy end faces engaging and adhesively fixed to the front and back walls. Thus the stop solidly engages the insert in the closed condition, preventing overstressing of the pivot pin or tearing of the envelope. Furthermore the insert has a relatively thin center portion formed with the seat and a transversely projecting peripheral edge flange. This flange typically projects in both directions from the mainly planar main body of the insert and is of a dimension that it neatly closes the end of the cavity in the closed position so as to keep the disk therein clean. The stop has a transverse thickness equal substantially to a transverse thickness of the flange. Thus the stop prevents crushing of the envelope in the open position.

According to the invention the main body is formed with a transversely projecting cylindrical rim of predetermined height around the hole and the pin is formed with a smaller-diameter transversely projecting cylindrical rim of the height. The pin is formed with at least one diametrally extending web and has to one side of the web a front floor closely juxtaposed with and adhesively adhered to the front wall and to an other side of the web a back floor offset from the front floor and closely juxtaposed with and adhesively adhered to the back wall.

According to the invention the main body is formed with a circular ridge defining the seat. Further this body is formed centrally in the seat with a projecting hub dimensioned to fit with a central hole in a media disk. The hub includes a plurality of elastically deflectable fingers projecting from the main body. The main body is formed at the ridge with a large-diameter throughgoing hole, whereby a disk can be pushed out of the seat by a finger projecting through the hole. Furthermore the main body is formed in the seat with a plurality of small bumps, whereby a media disk in the seat is held out of surface contact with the main body by the bumps.

The edge region allows the user of the case to grip the insert and pivot it out. To this end the edge-region has generally semicylindrical ridges and the cutout are complementarily semicylindrical, and the main body lies wholly between front and back parallel planes except at the ridges that project past the respective planes.

The method according to the invention basically comprises the steps of providing an envelope having spaced front and back walls forming a cavity opening at an envelope edge formed with a cutout and providing a flat plastic insert unitarily formed with a main body having a seat adapted to hold the disk, a thickened edge region on the main body, a throughgoing hole in the main body, a plastic pin in the hole, a first frangible web between the pin and an inner edge of the hole, a stop edge on the main body, a plastic stop, and a second frangible web between the stop and the stop edge. Then the insert is fitted into the cavity so that it is generally wholly enclosed by the envelope and the thickened edge region is fitted to the cutout. The pin and the stop are then adhesively fixed to the front and back walls.

The envelope can be made cheaply of cardboard and the insert can be injection molded of plastic. The entire case is therefore made up of two parts that are eventually separated into four parts.

The pin according to the invention has end faces offset from faces of the main body. In this case the second frangible web is ruptured, normally after fitting the insert to the envelope although in theory this could be done before, so as to disconnect the pin from the main body. Then the pin is adhered to the front and back walls. Prior to rupturing the web, the pin projects past a planar face of the main body, thus once the insert is fitted to the envelope, simple pressure on opposite sides of the envelope breaks the pin free but, since it is captured in the hole, it remains perfectly positioned for the subsequent gluing operation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
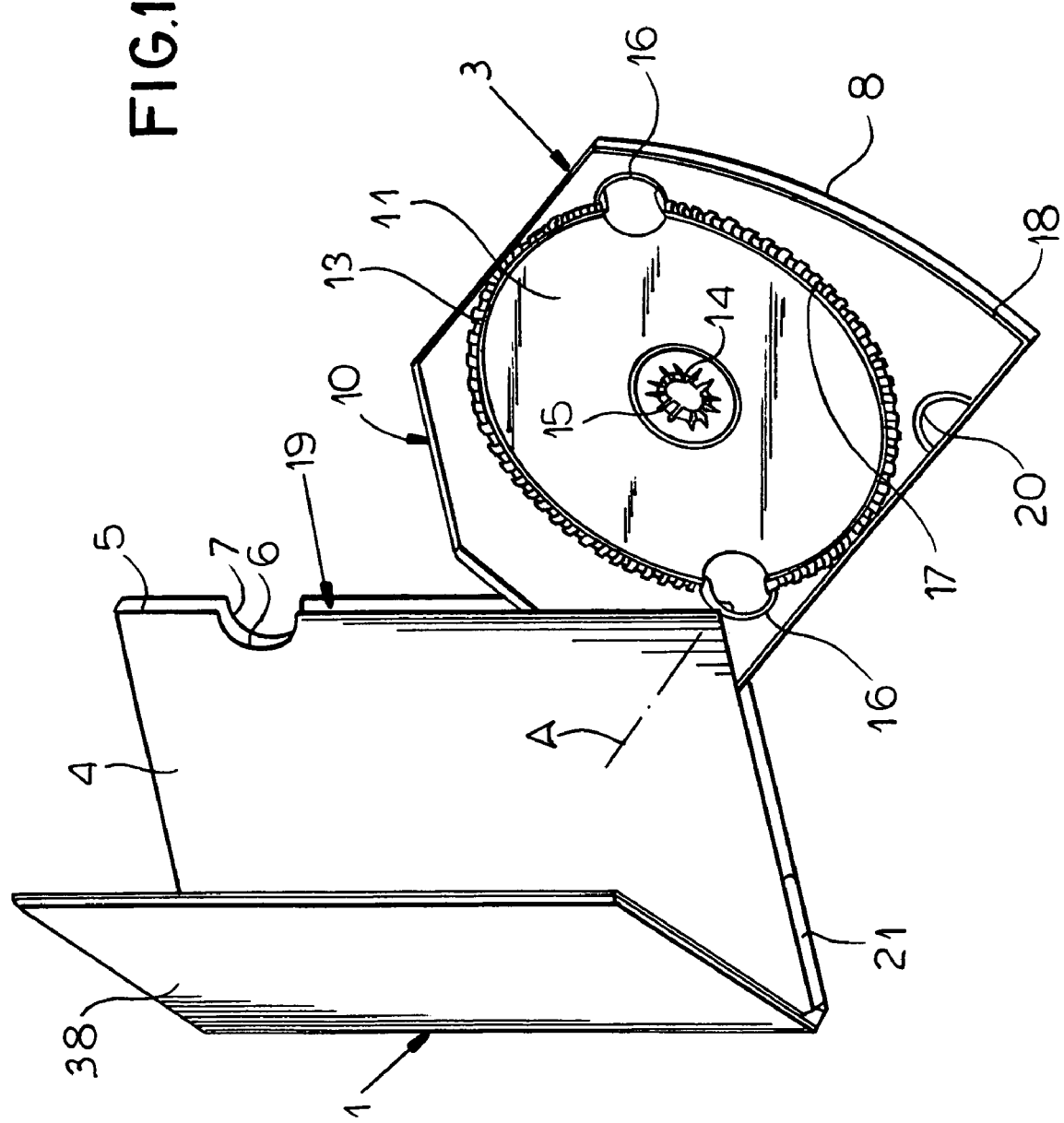
FIG. 1 is a perspective view of the case according to the invention with the insert swung out of the envelope in an open position.
Figure 2:
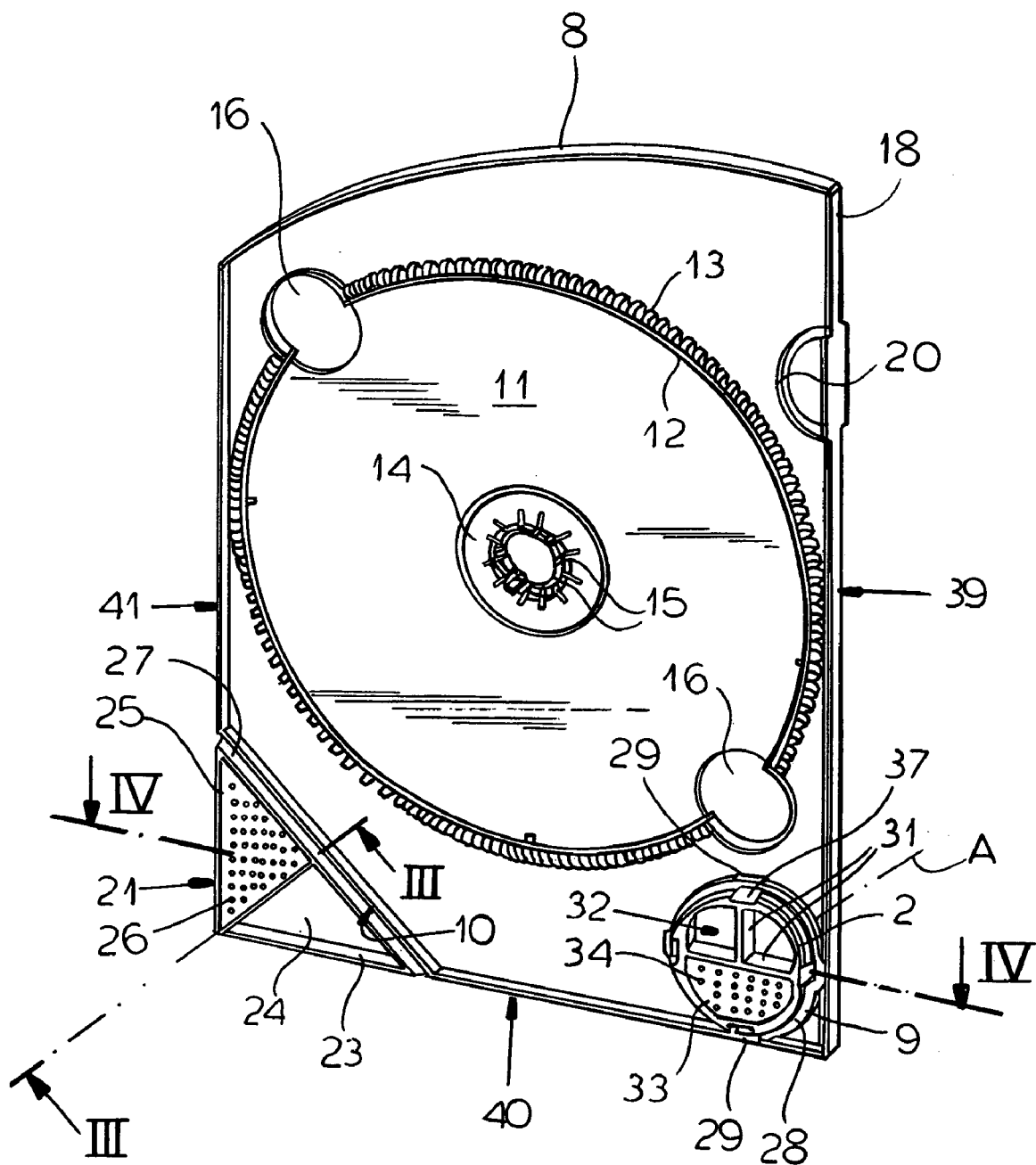
FIG. 2 is a perspective view of the insert of the case.
Figure 6:
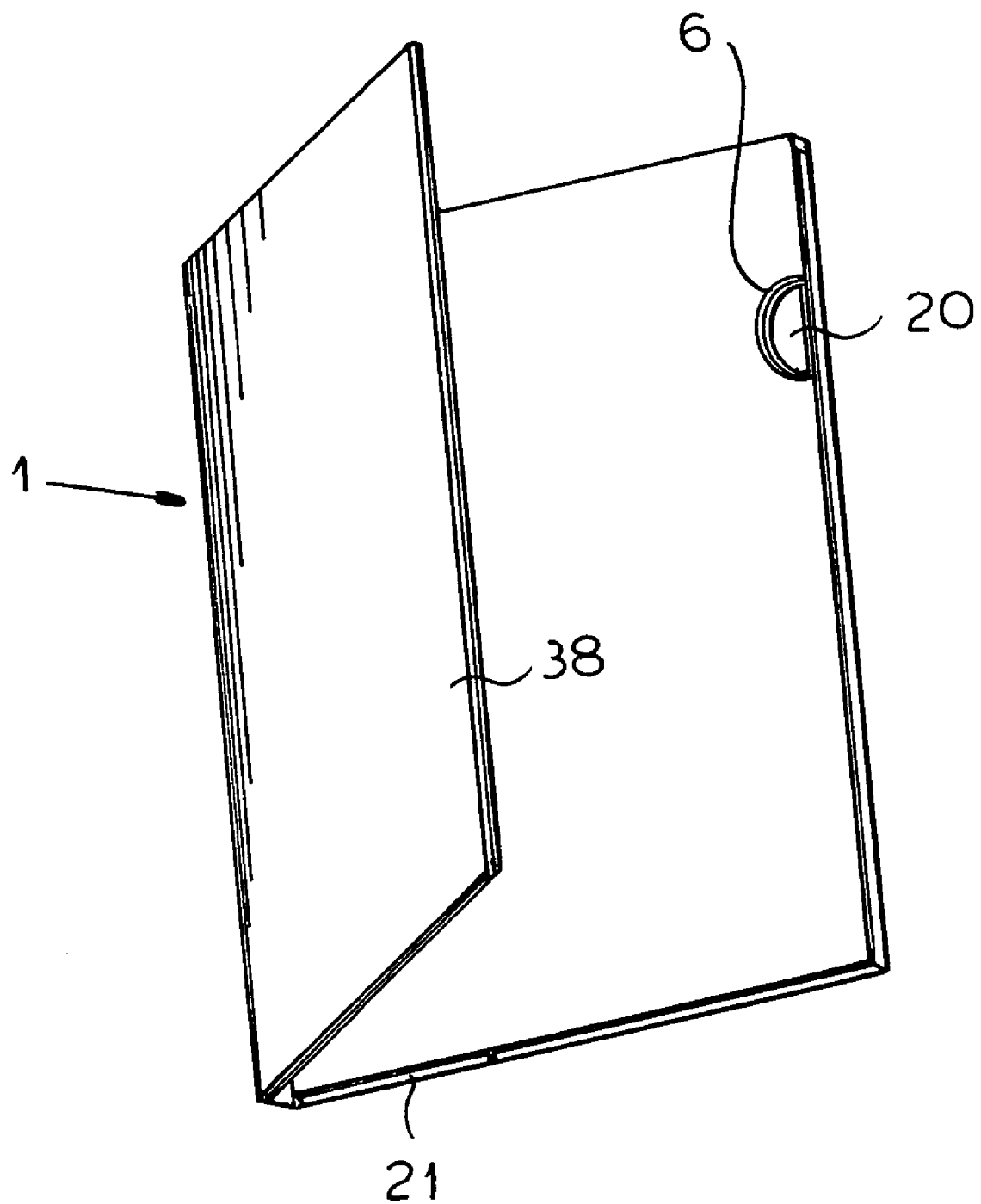
FIG. 6 is a perspective view of the case with the insert fully inside the envelope in a closed position.

As seen in FIGS. 1 and 6 a disk case according to the invention basically comprises a folded-cardboard envelope 1 having rectangular and planar front and back walls 4 and 5 and a flap 38, and an insert 3 pivoted at an axis A perpendicular to the walls 4 and 5. The insert 3 is movable between the open position of FIG. 1 in which it is swung largely outside from a cavity 19 between the walls 4 and 5 of the envelope 1 and the closed position of FIG. 6 in which the insert 3 is substantially wholly contained in the cavity 19 between the walls 4 and 5 of the envelope 1. A pivot pin or body 2 of molded plastic 2 is fixed to the walls 4 and 5, passes through a hole 9 in the insert 3, and defines the axis A. The cover 38 could in fact be formed as two flaps forming another such cavity 19 so the case could hold two separate inserts 3 each holding two separate disks.

This insert 3 is injection molded of plastic and has an outer edge 39 and bottom edge 40 that are both straight and perpendicular to each other, an inner edge 41 parallel to the outer edge 39, and a top edge 8 that is formed as a circular arc centered on the axis A and bridging upper ends of the edges 39 and 41. The edges 40 and 41 do not meet at a corner, but instead are bridged by an angled stop edge 10 extending at an angle α of 45° to both these edges 40 and 41, and the edges 39, 40, 10, 41, and 8 are all formed with a transversely projecting flange 18 of the same dimension as the width of the cavity 19. Thus the insert 3 is basically five-sided, with four straight edges 39, 40, 10, and 41, and one curved edge 8. The insert 3 further has two substantially planar opposite faces one or both of which are formed with a circular seat 11 defined by a ridge 12 reinforced by tooth-like formations 13. At the center of the seat 11 is a hub 14 defined by a ring of radially deflectable fingers 15 so that a media disk can be clipped in the seat 11 in a manner well known in the art. Two diametrically opposite throughgoing holes 16 at the periphery(ies) of the seat(s) 11 make it easy to free a media disk. Four angularly equispaced bumps 17 in the seat 11 engage a disk in point contact to prevent it from sticking.

In addition along the edge 39 the insert 3 is formed with a thickened thumb grip 20 that matches cutouts 6 and 7 in the corresponding edges of the panels 4 and 5 so that the insert 3 can easily be grabbed when in the FIG. 6 closed position and pulled out into the FIG. 1 open position. The insert 3 is thicker at this thumb grip 20 so that, when it fits to the cutouts 6 and 7, it defines a solid stop for pivoting of the insert 3.

Figure 3:
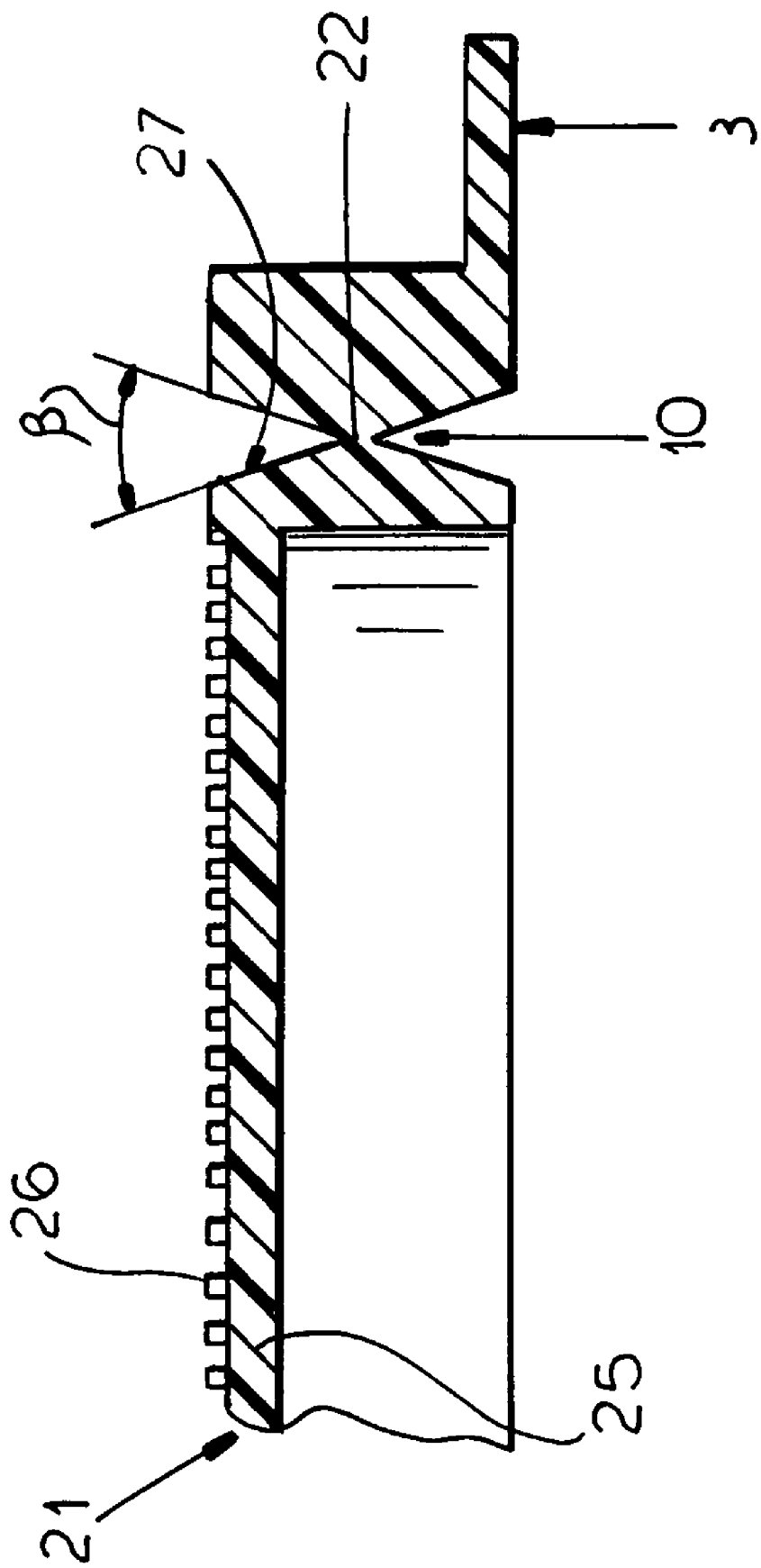
FIGS. 3 and 4 are sections taken along respective lines III—III and IV—IV of FIG. 2.

As also shown in FIG. 3, at the lower inside corner between the edges 40 and 41 there is a triangular stop 21 subdivided into a pair of identical triangular regions 24 whose floors 25 are oppositely offset and formed with fields or bumps 26 so they can be glued to the respective walls 4 and 5 of the cavity 19. This triangular stop 21 has an outer flange 23 identical to the flange 18 running along the edge 10 and in fact is initially joined to it by a frangible integral web 22 whose purpose is described in more detail below. The web 22 is formed by a pair of opposite triangular-section grooves having apex angles β equal to 30°.

Figure 4:
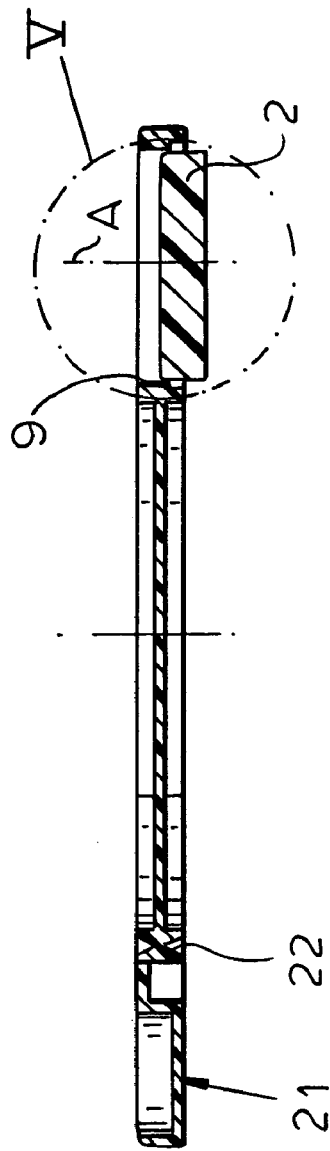
Figure 5:
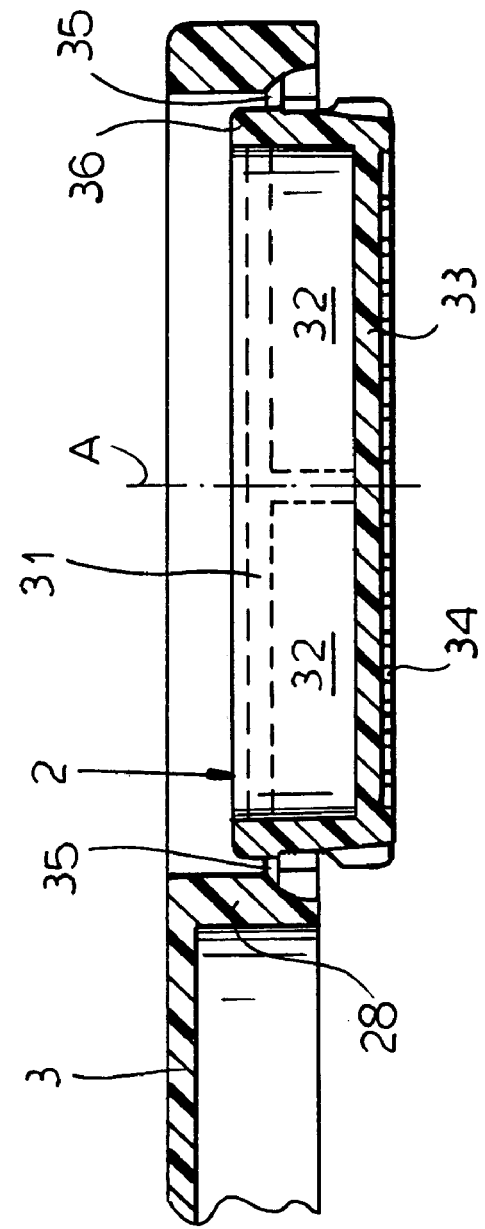
FIG. 5 is a large-scale view of the detail indicated at V in FIG. 4.

The pivot pin 2 is formed as shown in FIG. 4 with a cylindrical rim 36 fitting coaxially in a cylindrical rim 28 of the insert 3. The pin 2 is formed with two diametrally throughgoing and perpendicular ribs 31 subdividing it into four quadrants 32. Two of the quadrants 32 adjacent each other have a common floor 31 offset axially in one direction and the other two quadrants have a floor 33 oppositely offset. The floors 31 and 33 are formed with bumps 34 so they can be glued to the walls 4 and 5 of the cavity 19. The rim 36 is formed with angularly offset and radially inwardly open recesses 29 and the rim 28 has complementary radially outwardly open recess 37. Webs 35 in the confronting recesses 29 and 37 integrally join the pin 2 to the insert 3 with the outer edges of the rim 36 offset from those of the rim 28. Thus, to start with, the insert 3 is integrally connected to and formed with the stop 21 and pivot pin 2.

To put together the case according to the invention the envelope 1 is formed of cardboard, plastic or the like in its finished form. Then the insert 3, complete with the stop 21 and pivot pin 2, is fitted into the cavity 19. An appropriate glue is provided on the faces 25, 31, and 33, for instance a fast-drying adhesive or a heat-activated glue, and it is activated or allowed to set to fix the pin 2 and stop 21 solidly in place between the panels or walls 4 and 5 defining the cavity 19.

Before or after the adhesive takes effect the walls 4 and 5 are pressed together at the pin 2 to rupture the webs 35 and shift the pin 2 axially so it lies flush with the main body of the insert 3. This still leaves the insert 3 connected via the web 22 to the stop 21. If the seat or seats 11 have not been loaded with disks, this web 22 can be broken at this time, the insert 3 can be pivoted out, and the seat(s) can be loaded. Alternately, the seat or seats 11 are loaded before gluing the insert 3 in place and the web 22 is left intact as a tamper indicator. In the latter case, the first time the user pivots out the insert, normally after bending down the corner with the stop 21 to break the web 22, there is a clear and permanent indication that the package has been opened.

I claim:

1. A media-disk case comprising:
    an envelope having spaced front and back walls forming a cavity opening at an edge formed with a cutout;
    a plastic pin extending along an axis A in the cavity and having ends fixed adhesively to the walls;
    a plastic insert formed with a seat adapted to hold a media disk, with a thickened edge region, and with a hole traversed by the pin, the insert being fittable in the cavity and pivotal about the pin between an open position largely outside the cavity and a closed position contained in the cavity and with the edge region fitting in the cutout;
    a plastic stop adhesively fixed to the walls in the cavity, offset from the pin, and closely juxtaposed with and bearing on the insert in the closed position; and
    a frangible plastic web unitarily formed with the stop and with the insert, whereby the insert can only be moved from the closed position to the open position on rupturing of the web.

2. The disk case defined in claim 1 wherein the envelope is generally rectangular and has four corners, the pin being at one of the corners and the stop being at an adjacent one of the corners, the stop and insert bearing on each other in the closed position along a line.

3. The disk case defined in claim 2 wherein the line extends at about 45° to adjacent edges of the envelope.

4. The disk case defined in claim 2 wherein the pin, the insert, and the stop are of the same plastic.

5. The disk case defined in claim 2 wherein the stop is generally right-triangular.

6. The disk case defined in claim 5 wherein the stop and the pin have bumpy end faces engaging and adhesively fixed to the front and back walls.

7. The disk case defined in claim 2 wherein the insert has a relatively thin center portion formed with the seat and a transversely projecting peripheral edge flange.

8. The disk case defined in claim 7 wherein the stop has a transverse thickness equal substantially to a transverse thickness of the flange.

9. The disk case defined in claim 1 wherein the plastic insert is formed with a transversely projecting cylindrical rim of predetermined height around the hole and the pin is formed with a smaller-diameter transversely projecting cylindrical rim of the height.

10. The disk case defined in claim 9 wherein the pin is formed with at least one diametrally extending web and has to one side of the web a front floor closely juxtaposed with and adhesively adhered to the front wall and to an other side of the web a back floor offset from the front floor and closely juxtaposed with and adhesively adhered to the back wall.

11. The disk case defined in claim 1 wherein the plastic insert is formed with a circular ridge defining the seat.

12. The disk case defined in claim 11 wherein the plastic insert is formed centrally in the seat with a projecting hub dimensioned to fit with a central hole in a media disk.

13. The disk case defined in claim 12 wherein the hub includes a plurality of elastically deflectable fingers projecting from the plastic insert.

14. The disk case defined in claim 11 wherein the plastic insert is formed at the ridge with a large-diameter throughgoing hole, whereby a disk can be pushed out of the seat by a finger projecting through the hole.

15. The disk case defined in claim 11 wherein the plastic insert is formed in the seat with a plurality of small bumps, whereby a media disk in the seat is held out of surface contact with the plastic insert by the bumps.

16. The disk case defined in claim 1 wherein the edge region has generally semicylindrical ridges and the cutout is complementarily semicylindrical, the plastic insert lying wholly between front and back parallel planes except at the ridges that project past the respective planes.

17. A method of making a disk case comprising the steps of:
    providing an envelope having spaced front and back walls forming a cavity opening at an envelope edge formed with a cutout;
    providing a flat plastic insert unitarily formed with
        a main body having a seat adapted to hold a media disk,
        a thickened edge region on the main body,
        a throughgoing hole in the main body,
        a plastic pin in the hole,
        a first frangible web between the pin and an inner edge of the hole,
        a stop edge on the main body,
        a plastic stop, and
        a second frangible web between the stop and the stop edge;
    fitting the insert into the cavity so that it is generally wholly enclosed by the envelope and the thickened edge region is fitted to the cutout; and
    adhesively fixing the pin and the stop to the front and back walls.

18. The method defined in claim 17 wherein the pin has end faces offset from faces of the main body, the method further comprising the step of
    rupturing the second frangible web and thereby disconnecting the pin from the main body after fitting the insert to the cavity and before adhesively fixing the pin to the front and back walls.

19. The method defined in claim 18 wherein prior to rupturing of the web the pin projects past a planar face of the main body.

20. The method defined in claim 17 wherein the insert is injection-molded of plastic and the envelope is of cardboard.

* * * * *